(12) United States Patent
Lin et al.

(10) Patent No.: US 9,288,492 B2
(45) Date of Patent: Mar. 15, 2016

(54) MOTION PREDICTION OR COMPENSATION METHOD

(71) Applicant: Huawei Technologies Co., Ltd., Shenzhen, Guangdong (CN)

(72) Inventors: Sixin Lin, Shenzhen (CN); Mingyuan Yang, Shenzhen (CN); Jiantong Zhou, Shenzhen (CN); Haoping Yu, Bridgewater, NJ (US)

(73) Assignee: Huawei Technologies Co., Ltd., Shenzhen (CN)

( * ) Notice: Subject to any disclaimer, the term of this patent is extended or adjusted under 35 U.S.C. 154(b) by 323 days.

(21) Appl. No.: 13/947,681

(22) Filed: Jul. 22, 2013

(65) Prior Publication Data

US 2013/0315309 A1 Nov. 28, 2013

Related U.S. Application Data

(63) Continuation of application No. PCT/CN2012/070700, filed on Jan. 21, 2012.

(30) Foreign Application Priority Data

Jan. 22, 2011 (CN) .......................... 2011 1 0024415
Jan. 24, 2011 (CN) .......................... 2011 1 0025944

(51) Int. Cl.
*H04N 19/52* (2014.01)
*H04N 19/533* (2014.01)
(Continued)

(52) U.S. Cl.
CPC ......... *H04N 19/00606* (2013.01); *H04N 19/52* (2014.11); *H04N 19/523* (2014.11); *H04N 19/533* (2014.11); *H04N 19/56* (2014.11)

(58) Field of Classification Search
CPC ............ H04N 19/00606; H04N 19/52; H04N 19/533; H04N 19/56; C12Q 1/6895
USPC ...................................................... 375/240.14
See application file for complete search history.

(56) References Cited

U.S. PATENT DOCUMENTS 6,348,954 B1 2/2002 Takishima et al.
6,968,008 B1 11/2005 Ribas-Corbera
(Continued)

FOREIGN PATENT DOCUMENTS

CN 1525762 A 9/2004
CN 101686393 A 3/2010
(Continued)

OTHER PUBLICATIONS

International Search Report in corresponding PCT Patent Application No. PCT/CN2012/070700 (May 3, 2012).
(Continued)

*Primary Examiner* — Behrooz Senfi
(74) *Attorney, Agent, or Firm* — Leydig, Voit & Mayer, Ltd.

(57) ABSTRACT

Embodiments of the present invention provide a motion prediction or compensation method during a video coding and decoding process. A motion prediction or compensation method provided in the embodiments of the present invention includes: acquiring a candidate motion vector set; conducting a refined search for an optimal motion vector based on information of the candidate motion vector set; and performing motion prediction or compensation by using the motion vector acquired by the refined search. This improves coding performance and meanwhile maintains reasonable complexity.

19 Claims, 4 Drawing Sheets (51) Int. Cl.
*H04N 19/56* (2014.01)
*H04N 19/523* (2014.01)

(56) References Cited

U.S. PATENT DOCUMENTS

| | | | |
|---|---|---|---|
| 2002/0131500 A1* | 9/2002 | Gandhi | G06T 7/2026 375/240.16 |
| 2006/0256866 A1 | 11/2006 | Ziauddin et al. | |
| 2007/0110156 A1 | 5/2007 | Ji et al. | |
| 2011/0188579 A1 | 8/2011 | Lin et al. | |
| 2012/0294370 A1* | 11/2012 | Chiu | H04N 19/56 375/240.16 |

FOREIGN PATENT DOCUMENTS

| | | | | |
|---|---|---|---|---|
| EP | 1672926 A1 * | 6/2006 | | H04N 19/513 |
| JP | 2001045492 A | 2/2001 | | |

OTHER PUBLICATIONS

Written Opinion of the International Searching Authority in corresponding PCT Patent Application No. PCT/CN2012/070700 (May 3, 2012).

Chalidabhongse et al., "Fast Motion Vector Estimation Using Multiresolution-Spatio-Temporal Correlations," Jun. 1997, IEEE, New York, New York.

* cited by examiner

MOTION PREDICTION OR COMPENSATION METHOD

CROSS-REFERENCE TO RELATED APPLICATIONS

This application is a continuation of International Patent Application No. PCT/CN2012/070700, filed on Jan. 21, 2012, which claims priority to Chinese Patent Application No. 201110024415.9, filed on Jan. 22, 2011, and Chinese Patent Application No. 201110025944.0, filed on Jan. 24, 2011, all of which are hereby incorporated by reference in their entireties.

TECHNICAL FIELD

The present invention relates to the field of communications technologies, and in particular, to a motion prediction or compensation method in video coding and decoding.

BACKGROUND

Motion prediction and motion compensation are important technologies in video compression. A part of bits in a compressed video bitstream are used to transmit motion vector information. Especially in the case of a low bit rate, with respect to a high-definition video, bits consumed to transmit motion vector information generally account for over 50% of the total number of bits in a bitstream. Therefore, an optimal motion vector needs to be selected to improve coding efficiency. With respect to video coding of continuous dynamic images, a plurality of continuous images is divided into three types, P, B, and I. With respect to a P-frame, frame data is compressed by prediction according to correlation between the P-frame and a previous adjacent frame (an I-frame or a P-frame). With respect to a B-frame, frame data is compressed by prediction according to correlation between a previous adjacent frame, the B-frame, and a next frame. In view of the difference between the P-frame and the B-frame, during selection of a motion vector, a motion vector set is acquired for the P-frame according to a previous frame thereof only, whereas a motion vector set is acquired for the B-frame according to both a previous frame and a next frame thereof.

Figure 1:
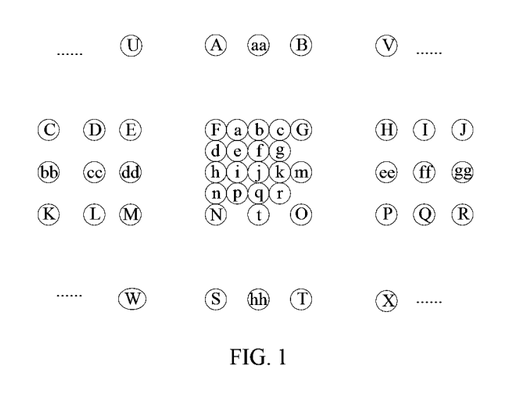
FIG. 1 is a schematic diagram of integer and non-integer pixel positions for interpolation.

A motion vector is used to depict a motion offset relationship between a frame and a reference adjacent frame. To improve accuracy in inter-frame prediction, the prior art employs a non-integer pixel interpolation technology to improve the accuracy in inter-frame prediction. FIG. 1 shows a position relationship of a ½ accuracy pixel or a ¼ accuracy pixel of pixels in an adjacent frame as a reference block in inter-frame prediction. Upper-case letters A/B/C/D/E/F . . . denote integer pixel accuracy positions, and lower-case letters b/h/j/m/t/aa/hh/dd/ee . . . denote ½ accuracy pixel positions, and lower-case letters a/c/d/e/g/i/k/n/p/q/r . . . denote ¼ accuracy pixel positions. The pixel in an integer pixel position is the original pixel of an image. The pixel in a ½ accuracy position and the pixel in a ¼ accuracy position are pixels in non-integer pixel positions acquired by integer pixel interpolation. During interpolation, an interpolation filter is used. For example, a ½ pixel b may be acquired by using an interpolation filter (1, −5, 20, 20, −5, 1)/64 to perform interpolation for integer pixel points D/E/F/G/H/I; and a ¼ accuracy pixel a may be acquired by using an interpolation filter (1, 1)/2 to perform interpolation filtering for the integer pixel point F and the ½ pixel point b.

Herein, a B-frame is used as an example. In the prior art, a motion estimation and compensation solution is as follows: Several coding blocks are included in each frame of an image; a spatial candidate motion vector of a coding block is acquired according to motion vectors of neighboring coding blocks (typically the left coding block, the upper left coding block, the upper coding block, and the upper right coding block), and median motion vectors are calculated according to the spatial candidate motion vectors; motion vectors of a coding block in the same position in a previous frame of the coding block, and motion vectors of the four neighboring and eight neighboring coding blocks are acquired, and temporal candidate motion vectors are acquired; one or a plurality of optimal motion vectors are selected, from a candidate motion vector set constituted by the spatial candidate motion vectors, the median motion vectors, and the temporal candidate motion vectors, as a forward motion vector and/or a backward motion vector for motion compensation of the current block. The same process of selecting an optimal motion vector may apply to a coding end and a decoding end. Therefore, motion vector information does not need to be transmitted, thereby saving bits for transmitting the motion vector information. A typical selection process is: using a corresponding reference block in a forward or backward reference frame which each piece of motion vector information in a candidate motion vector set of a coding block points to as a template block, using a minor position of the motion vector information to acquire a block corresponding to the template in the forward or backward reference frame, calculating differences between two templates and the blocks corresponding to the templates (a mean square error or a sum of pixel interpolation absolute values may be used), and selecting the motion vector information having the smallest difference as an optimal motion vector of the current coding block. Motion prediction or compensation is performed by using the motion vector, to implement coding and decoding.

The motion prediction and compensation can be accurate to a non-integer pixel position. Therefore, in motion prediction and compensation at the coding and decoding ends, during selection of an optimal motion vector, positions pointed to by a large number of candidate motion vectors need to be searched and an optimal motion vector needs to be selected from the candidate motion vectors and used in prediction and compensation. Because the candidate motion vectors are motion vector information of neighboring temporal and spatial related image blocks of the current coding or decoding block, when these motion vectors are served as the motion vectors of the current block, accuracy is not enough. However, it is extremely complex to conduct a pixel-level motion search. Therefore, it is a critical issue to improve coding performance of the existing solution and maintain reasonable complexity.

SUMMARY

Embodiments of the present invention provide a motion prediction or compensation method during a video coding and decoding process to improve coding performance and maintain reasonable complexity.

An embodiment of the present invention provides a motion prediction or compensation method, including:
acquiring a candidate motion vector set;
conducting a refined search for an optimal motion vector based on information of the candidate motion vector set; and
performing motion prediction or compensation by using the motion vector acquired by the refined search.

According to the technical solutions provided by the embodiments of the present invention, a candidate motion vector set is acquired; a refined search for an optimal motion vector is conducted based on information of the candidate motion vector set; and motion prediction or compensation is performed by using the motion vector acquired by the refined search. By using the preceding technical means, coding performance is improved and meanwhile reasonable complexity is maintained.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make those skilled in the art better understand the technical solutions of the embodiments of the present invention, and make the objectives, features, and advantages of the embodiments of the present invention more comprehensible, the following further describes the technical solutions of the embodiments of the present invention with reference to accompanying drawings.

Embodiment 1

Figure 2:
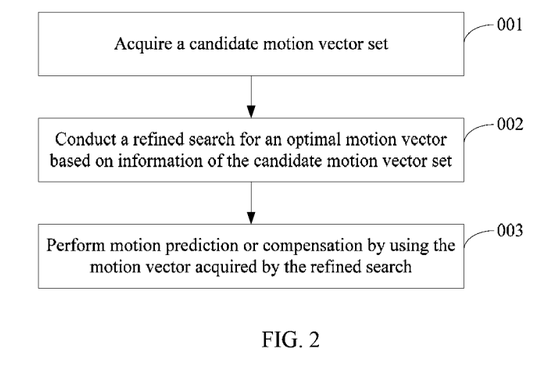
FIG. 2 is a flowchart of a motion prediction or compensation method according to an embodiment of the present invention.

FIG. 2 illustrates a motion prediction or compensation method according to an embodiment of the present invention, including:

Step 001: Acquire a candidate motion vector set.

In the embodiment of the present invention, different motion vector sets each may serve as the candidate motion vector set.

In some embodiments, the candidate motion vector set may be a first motion vector set, where the first motion vector set is generated by using at least one of temporal and spatial motion vectors related to a current coding or decoding block.

In some embodiments, the candidate motion vector set may be a second motion vector set, and the acquiring the candidate motion vector set includes: generating an initial motion vector set by using at least one of temporal and spatial motion vectors related to a current coding or decoding block; and negating motion vectors in the initial motion vector set to acquire negated motion vectors, where the negated motion vectors and the initial candidate motion vector set constitute the second motion vector set.

In some embodiments, the candidate motion vector set may be a third motion vector set, and acquiring a candidate motion vector set includes: generating an initial motion vector set by using at least one of temporal and spatial motion vectors related to a current coding or decoding block; negating motion vectors in the initial motion vector set to acquire negated motion vectors; and rounding motion vectors in a new motion vector set formed by the negated motion vectors and the initial candidate motion vector set, to acquire the third motion vector set.

The above example describes the vector set serving as a candidate motion vector set. However, in some other embodiments, the candidate motion vector set may also be acquired in other manners The manner of acquiring a candidate motion vector set is not limited to those described above. Any variation made on the basis of the embodiments of the present invention falls within the protection scope of the present invention.

Step 002: Conduct a refined search for an optimal motion vector based on information of the candidate motion vector set.

In some embodiments, the information of the candidate motion vector set is the number of candidate motion vectors; and conducting a refined search for an optimal motion vector based on information of the candidate motion vector set and performing motion prediction or compensation by using the motion vector acquired by the refined search includes:

if the number of motion vectors is smaller than or equal to N, conducting the refined search for an optimal motion vector, and performing the motion prediction or compensation by using the motion vector acquired by the refined search; and if the number of motion vectors is larger than N, conducting no refined search for a motion vector, and performing the motion prediction or compensation directly by using the optimal motion vector;

where N is a positive integer smaller than the total number of motion vectors in the candidate motion vector set.

In some embodiments, the information of the candidate motion vector set is the number of non-integer pixel motion vectors in the candidate motion vectors; and conducting a refined search for an optimal motion vector based on information of the candidate motion vector set and performing motion prediction or compensation by using the motion vector acquired by the refined search includes:

if the number of non-integer pixel motion vectors is smaller than or equal to N, conducting the refined search for an optimal motion vector, and performing the motion prediction or compensation by using the motion vector acquired by the refined search; and if the number of non-integer pixel motion vectors is larger than N, conducting no refined search for a motion vector, and performing the motion prediction or compensation directly by using the optimal motion vector;

where N is a positive integer smaller than the total number of non-integer pixel motion vectors in the candidate motion vector set.

Step 003: Perform motion prediction or compensation by using the motion vector acquired by the refined search.

Motion prediction or compensation is performed by using the optimal motion vector acquired by the refined search, to complete a coding and decoding process. This method is based on the prior art, and is not further described herein.

Embodiment 2

Figure 3A:
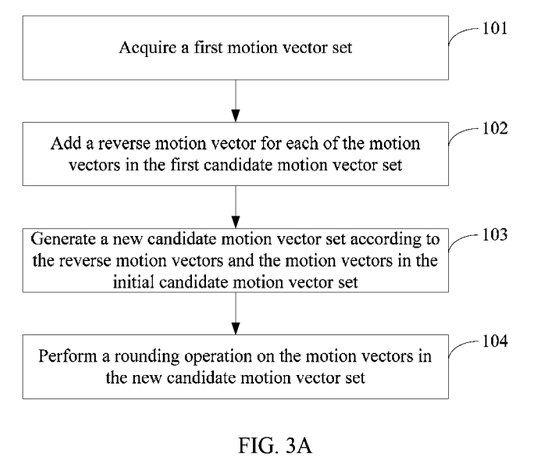
FIG. 3A is a flowchart of a first embodiment of the present invention.

Referring to FIG. 3A, the method for generating a candidate motion vector set according to Embodiment 1 is further described as follows:

Step 101: Acquire a first motion vector set, where the first motion vector set is generated by using at least one of temporal and spatial motion vectors related to a current coding or decoding block. That is, an initial candidate motion vector set of the current coding or decoding block is acquired.

Specifically, a spatial candidate motion vector is acquired according to neighboring coding or decoding blocks of the current coding or decoding block, and a temporal candidate motion vector of the current coding or decoding block is acquired according to a reference frame. The reference frame may be a previous frame, or a next frame, or a previous frame and a next frame of a current frame where the current coding or decoding block is located. The spatial candidate motion vector and the temporal candidate motion vector constitute an initial motion vector set.

Figure 3B:
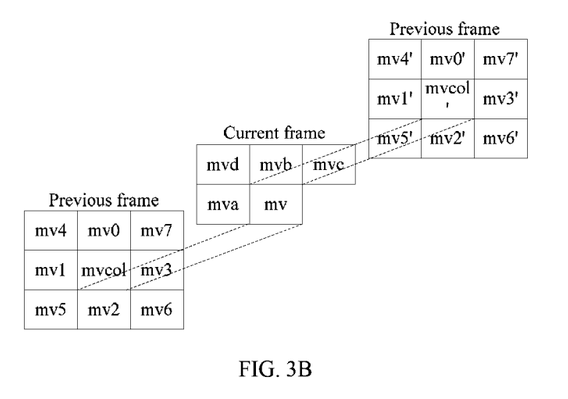
FIG. 3B is a schematic diagram of motion vector selection of a coding block in a B-frame according to an embodiment of the present invention.

Referring to FIG. 3B, a schematic diagram of motion vector selection of a coding or decoding block in a B-frame having a bidirectional motion compensation feature is illustrated. Assuming that a coding or decoding block my in the current frame is the current coding or decoding block, neighboring coding or decoding blocks of the current coding or decoding block mv generally refer to a left coding or decoding block $mv_a$, an upper coding or decoding block $mv_b$, an upper right coding or decoding block $mv_c$, and an upper left coding or decoding block $mv_d$ relative to the my illustrated in FIG. 3B, and a spatial candidate motion vector of the current coding or decoding block my is acquired according to the coding or decoding blocks $mv_a$, $mv_b$, $mv_c$, and $mv_d$. Assuming that the reference frame is the previous frame of the current frame, a reference block whose position in the previous frame is corresponding to the position of the current coding or decoding block in the currunt frame my is $mv_{col}$, and corresponding four neighboring and eight neighboring coding or decoding blocks are $mv_0$ to $mv_7$, and a temporal candidate motion vector of the my is acquired according to the $mv_{col}$ and the $mv_0$ to $mv_7$. Similarly, a temporal candidate motion vector may also be acquired according to the coding or decoding block $mv_{col}'$ whose position in the next frame is corresponding to the position of the current coding or decoding block in the currunt frame my and its corresponding four neighboring and eight neighboring coding or decoding blocks $mv_0'$ to $mv_7'$.

The first motion vector set acquired by using the above method may serve as a candidate motion vector set for use in conducting a refined search for an optimal motion vector based on information of the candidate motion vector set.

In some embodiments, the candidate motion vector set may be a second motion vector set. That is, motion vectors in the initial motion vector set acquired in step 101 are negated to acquire negated motion vectors; and the negated motion vectors and the initial candidate motion vector set constitute the second motion vector set. The details are as follows:

Step 102: Add a reverse motion vector for each of the motion vectors in the first candidate motion vector set.

Specifically, a reverse motion vector may be added for each of the motion vectors in the initial candidate motion vector set according to a preset motion model. The preset motion model includes a uniform linear motion model or an acceleration motion model.

Figure 3C:
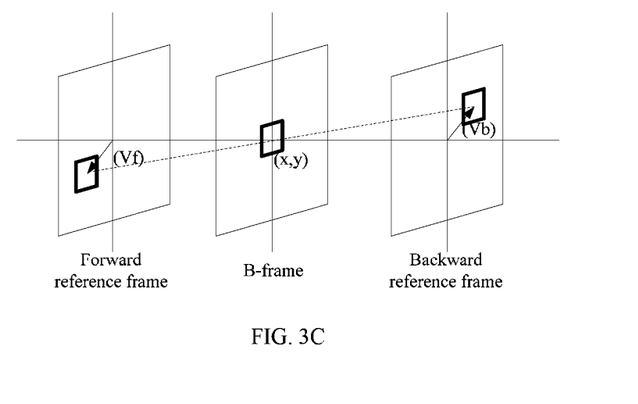
FIG. 3C is a schematic diagram of a B-frame uniform linear motion model according to an embodiment of the present invention.

The following uses a uniform linear motion model as an example for description. Referring to FIG. 3C, a schematic diagram of a B-frame uniform linear motion model is illustrated. It is assumed: that $V_b$ is a backward motion vector, $V_f$ is a forward motion vector, the distance between a B-frame and a forward reference frame is $T_f$, and the distance between the B-frame and a backward reference frame is $T_b$. With respect to the uniform linear motion model illustrated in FIG. 3C, each pair of forward and backward motion vectors satisfy the following equation: $V_f/T_f=-V_b/T_b$.

In addition, besides the uniform linear motion model illustrated in FIG. 3C, an acceleration motion model may also be used. In this case, the two motion vectors $V_f$ and $V_b$ may satisfy the equation $V_f=-(V_b+\alpha)$, where $\alpha$ denotes a speed difference.

The above negate operation may be performed on each of the motion vectors in the initial candidate motion vector set; or may not be performed for a motion vector for which a reverse relationship has been formed in the initial candidate motion vector, but performed for the remaining motion vectors instead.

Step 103: Generate a new candidate motion vector set according to the reverse motion vectors and the motion vectors in the initial candidate motion vector set.

After reverse motion vectors are added for motion vectors in the initial candidate motion vector set, a forward candidate motion vector set is formed by using the added reverse motion vectors and all forward motion vectors of the motion vectors in the initial candidate motion vector set, and a backward candidate motion vector set is formed by using the added reverse motion vectors and all backward motion vectors.

In addition to the manners of forming the forward candidate motion vector set and the backward candidate motion vector set, all forward motion vectors and backward motion vectors may also be included in a new candidate motion vector set. The new candidate motion vector set includes several groups of motion vectors, where each group of motion vectors has corresponding forward motion vectors and backward motion vectors, and groups of corresponding forward motion vectors and backward motion vectors may be differentiated by identifier information.

The second motion vector set acquired by using the above steps may serve as a candidate motion vector set for use in conducting a refined search for an optimal motion vector based on information of the candidate motion vector set.

In some embodiments, the candidate motion vector set may be a third motion vector set. That is, the acquired second motion vector set is rounded to acquire the third motion vector set. The details are as follows:

Step 104: Perform a rounding operation on the motion vectors in the new candidate motion vector set.

Specifically, with respect to the motion vector in the candidate motion vector set, a rounding operation is performed according to the position of the motion vector. For each dimension of a candidate motion vector, when a coordinate in the dimension is a non-integer pixel position, the coordinate value of the non-integer pixel position motion vector in the dimension is rounded to one of integer pixel coordinate positions A and B if distances from the coordinate of the non-integer pixel position motion vector in the dimension to the integer pixel coordinate positions A and B adjacent to the non-integer pixel position in the dimension are the same, where an integer pixel coordinate position is determined by a sign of the coordinate value of the non-integer pixel position motion vector in the dimension.

Herein, ¼ non-integer pixel accuracy motion estimation and motion compensation are used as an example for description. Referring to a pixel point position relationship as shown in FIG. 1, if a motion vector in the candidate motion vector set points to a position F or G, the motion vector is an integer pixel accuracy motion vector; if a motion vector in the candidate motion vector set points to a position b, the motion vector is a ½ accuracy motion vector; and if a motion vector in the candidate motion vector set points to a position a or c, the motion vector is a ¼ accuracy motion vector. When a motion vector in the candidate motion vector set has integer pixel accuracy, no rounding operation needs to be performed on the motion vector. When a motion vector in the candidate motion vector set has ¼ accuracy, a rounding operation is performed on the motion vector according to a proximity principle. For example, when a motion vector (x1, y1) points to the position a, because two integer pixel positions adjacent to a are F(x2, y2) and G(x3, y3) and the distance from a to F is shorter than that from a to G, a is rounded to the position F, and the candidate motion vector (x1, y1) is rounded to (x2, y2). Similarly, c is rounded to the position G. When a motion vector in the candidate motion vector set has ½ accuracy, because the distances from the two adjacent integer pixel positions to the position that the motion vector points to are the same, during the rounding, the motion vector needs to be rounded to a different integer pixel position according to a sign of the current motion vector. When the motion vector (x1, y1) points to the ½ pixel position b in FIG. 1, the distance from the integer pixel position F to b and the distance from the integer pixel position G to b are the same. When a rounding operation is performed on b, if the sign of x1 is positive, x-coordinates of the points F and G are positive, and the absolute value of the x-coordinate of the point F is smaller than the absolute value of the x-coordinate of the point G, the coordinate in the x1 dimension of b is rounded to the coordinate x2 of the point F; if the sign of x1 is negative, and x-coordinates of the points F and G are negative, and the absolute value of the x-coordinate of the point F is larger than the absolute value of the x-coordinate of the point G, the coordinate in the x1 dimension of b is rounded to the coordinate x2 of the point F. Similarly, when the motion vector (x1, y1) points to the ½ pixel position h in FIG. 1, the distances from the position h to the F(x2, y2) and N(x4, y4) in the direction of the y-coordinate are the same; if y1 is positive, the coordinate y1 is rounded to the coordinate y4 of the point N, and if y1 is negative, the coordinate y1 is rounded to the coordinate y4 of the point N. The above rounding process is reversible. To be specific, if the sign of x1 is positive, x-coordinates of the points F and G are positive, and the absolute value of the x-coordinate of the point F is smaller than the absolute value of the x-coordinate of the point G, the coordinate in the x1 dimension of b is rounded to the coordinate x3 of the point G; if the sign of x1 is negative, x-coordinates of the points F and G are negative, and the absolute value of the x-coordinate of the point F is larger than the absolute value of the x-coordinate of the point G, the coordinate in the x1 dimension of b is rounded to the coordinate x3 of the point G.

The above process may be expressed as the following pseudo code. Herein, it is assumed that a motion vector in the motion vector set is MV and that the x-coordinate and y-coordinate values of the motion vector are MV_x and MV_y, respectively, and rounding of MV_x is used as an example for description. The detailed description is as follows:

```
iTmp = MV_x;
MV_pos = abs(MV_x) & 0x3;
If(MV_pos = =3 || MV_pos = =1)
{
    iSign = iTmp >= 0 ? 1 : -1;
    iAbs = abs( iTmp );
    iTmp = ((( iAbs + 2 ) >> 2 ) << 2);
    MV_x = iSign * iTmp ;
}
Else if (MV_pos = =2)
{
    iTmp = ((MV_x >> 2 ) << 2 );
    MV = iTmp;
}
```

The above rounding process is specifically described as follows: A rounding operation is performed on the x-coordinate and y-coordinate of the candidate motion vector; using the x-coordinate as an example, whether the current x-coordinate is a ½ pixel or a ¼ pixel is determined according to the lowest two bits of the x-coordinate; the absolute value of the coordinate value of a ¼ pixel position motion vector is calculated, 2 is added, and the coordinate is shifted right by two bits, and then shifted left by two bits to acquire the absolute value of the coordinate in the dimension after the rounding, where the sign of the coordinate in the dimension remains unchanged; the coordinate in the dimension of the coordinate value of a ½ pixel position motion vector is shifted right by two bits, and then shifted left by two bits to acquire the coordinate value in the dimension after the rounding. No rounding operation is performed on an integer pixel point, or for ease of implementation, a rounding operation may be performed on an integer pixel point.

The third motion vector set acquired by using the above steps may serve as a candidate motion vector set for use in conducting a refined search for an optimal motion vector based on information of the candidate motion vector set.

In the above embodiment, the technical solution of the present invention is described by using a motion prediction and compensation process with ¼ accuracy as an example. The rounding method when the motion prediction and compensation accuracy is a ½ pixel or ⅛ pixel or the operation of rounding a ¼ and ⅛ point to a ½ pixel accuracy position and an integer pixel accuracy position is similar to the operation described in the above embodiment.

The rounding target in the rounding method according to the present invention may be extended according to actual system requirements. An integer pixel position is set as a rounding target, and ½ and/or ¼ pixel position is rounded to an integer pixel position.

Alternatively, an integer pixel position and a ½ pixel position are set as the rounding targets, a ½ pixel position is regarded as an integer pixel position, and ¼ and/or ⅛ is rounded to an integer pixel position and a ½ pixel position.

Selection of different rounding targets causes different compression performance and complexity, thereby meeting different application requirements.

In some embodiments, another solution for implementing rounding is as follows:

The rounding process described in step 104 may also be the following rounding process expressed by a pseudo code for rounding of the x-coordinate:

```
iTmp = MV_x;
MV_pos = MV_x & 0x3;
if ((MV_pos = =1) && (MV_x <0))
    MV = MV -1;
else if((MV_pos = = 3)&&( MV_x >0))
```

```
MV = MV + 1;
iTmp = ((MV__x >> 2 ) << 2 );
MV__x = iTmp;
```

The above rounding process is specifically as follows: A rounding operation is performed on the x-coordinate and y-coordinate according to the candidate motion vector; using the x-coordinate as an example, when the lowest two bits of the x-coordinate are 01, and the x-coordinate is a negative value, 1 is subtracted from the x-coordinate; when the lowest two bits of the x-coordinate are 11, and the x-coordinate is a positive value, 1 is added to the x-coordinate; after such operations, the x-coordinate is shifted right by two bits, and then shifted left by two bits to acquire the x-coordinate value after the rounding, thereby completing the rounding process of the x-coordinate.

During the specific implementation, the pseudo code solution in the above embodiment is merely an example for illustrating the specific implementation of the rounding method. Apparently, those skilled in the art may easily think of other embodiments based on the embodiments of the present invention. Under the technical conception disclosed in the embodiments of the present invention, software and hardware implementation solutions which can represent the essence of the present invention all fall within the protection scope of the present invention.

The method for rounding motion vectors in a new motion vector set in step 104 includes: performing a rounding operation on a coordinate value of a non-integer pixel position motion vector, where the rounding operation includes: for each dimension of coordinates of the non-integer pixel position motion vector, when a coordinate in the dimension is a non-integer pixel position, rounding the coordinate value of the non-integer pixel position motion vector in the dimension to one of integer pixel coordinate positions A and B if distances from the coordinate of the non-integer pixel position motion vector in the dimension to the integer pixel coordinate positions A and B adjacent to the non-integer pixel position in the dimension are the same, where an integer pixel coordinate position is determined by a sign of the coordinate value of the non-integer pixel position motion vector in the dimension.

In the technical solutions provided by the embodiments of the present invention, a rounding operation is performed on a coordinate value of a non-integer pixel position motion vector, where the rounding operation includes: for each dimension of coordinates of the non-integer pixel position motion vector, when a coordinate in the dimension is a non-integer pixel position, rounding the coordinate value of the non-integer pixel position motion vector in the dimension to one of integer pixel coordinate positions A and B if distances from the coordinate of the non-integer pixel position motion vector in the dimension to the integer pixel coordinate positions A and B adjacent to the non-integer pixel position in the dimension are the same, where an integer pixel coordinate position is determined by a sign of the coordinate value of the non-integer pixel position motion vector in the dimension. By using the preceding technical means, the problem of high complexity in selecting an optimal motion vector from a candidate motion vector set in the prior art is solved and better coding performance is maintained.

In the embodiments of the present invention, if the distances from the coordinate of the non-integer pixel position motion vector in the dimension to the integer pixel coordinate positions A and B adjacent to the non-integer pixel position in the dimension are the same, the coordinate position of the non-integer pixel position motion vector in the dimension is a ½ pixel position. In this case, rounding the coordinate value of the non-integer pixel position motion vector in the dimension to one of integer pixel coordinate positions A and B includes: shifting the coordinate value of the non-integer position motion vector in the dimension right by two bits in the dimension, shifting the same left by two bits, and rounding the coordinate value of the non-integer position motion vector to one of the integer pixel coordinate positions A and B.

In the embodiments of the present invention, determining the integer pixel coordinate position by the sign of the coordinate value of the non-integer pixel position motion vector in the dimension includes:

when the sign of the coordinate value of the non-integer pixel position motion vector is positive, the integer pixel coordinate position acquired by rounding the coordinate value of the non-integer pixel position motion vector being a position with a smaller absolute value from A and B; when the sign of the coordinate value of the non-integer pixel position motion vector is negative, the integer pixel coordinate position acquired by rounding the coordinate value of the non-integer pixel position motion vector being a position with a larger absolute value from A and B; or when the sign of the coordinate value of the non-integer pixel position motion vector is negative, the integer pixel coordinate position acquired by rounding the coordinate value of the non-integer pixel position motion vector being a position with a smaller absolute value from A and B; when the sign of the coordinate value of the non-integer pixel position motion vector is positive, the integer pixel coordinate position acquired by rounding the coordinate value of the non-integer pixel position motion vector being a position with a larger absolute value from A and B.

In some embodiments, if the coordinate position of the non-integer pixel position motion vector in the dimension is a ¼ pixel position instead of a ½ pixel position, rounding the coordinate value of a ¼ pixel position motion vector to an integer pixel accuracy position is rounding the coordinate value of the non-integer pixel position motion vector in the dimension to a closest integer pixel coordinate position.

In some embodiments, before rounding the coordinate value of the non-integer pixel position motion vector, the method further includes: acquiring a candidate motion vector set of a current coding or decoding block, adding a reverse motion vector for each of the motion vectors in the initial candidate motion vector set, and generating a new candidate motion vector set according to the reverse motion vectors and the motion vectors in the initial candidate motion vector set, to perform the rounding operation.

In the embodiments of the present invention, a ½ pixel position is used as an example to describe the method for rounding the coordinate value of the non-integer pixel position motion vector, which does not constitute a limitation on the present invention. If an integer pixel position is set as a rounding target, a ½ pixel position and/or a ¼ pixel position is rounded to the integer pixel position. In another embodiment, if an integer pixel position and a ½ pixel position are set as rounding targets, the ½ pixel position is regarded as an integer pixel position, and a ¼ pixel position and/or a ⅛ pixel position is rounded to the integer pixel position and the ½ pixel position. In this case, the integer pixel position in the embodiments of the present invention includes the ½ pixel position. According to this idea, those skilled in the art may find it easy and obvious to reach a further extension method.

Figure 4:
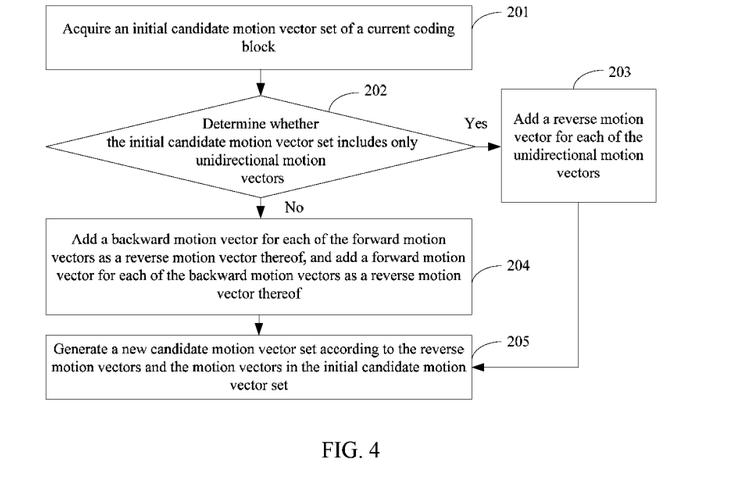
FIG. 4 is a flowchart of acquiring a second motion vector set according to another embodiment of the present invention.

In some embodiments, the method for acquiring a second motion vector may be implemented in a plurality of manners Referring to FIG. 4, a flowchart of another embodiment of the present invention for acquiring a second motion vector set in a video coding method is illustrated. This embodiment describes a process of uniformly determining motion vectors and generating reverse motion vectors.

Step 201: Acquire an initial candidate motion vector set of a current coding block.

Specifically, a spatial candidate motion vector is acquired according to neighboring coding blocks of the current coding block, and a temporal candidate motion vector of the current coding block is acquired according to a reference frame. The reference frame may be a previous frame, or a next frame, or a previous frame and a next frame of a current frame where the current coding block is located. The spatial candidate motion vector and the temporal candidate motion vector constitute an initial motion vector set.

Step 202: Determine whether the initial candidate motion vector set includes only unidirectional motion vectors; if the initial candidate motion vector set includes only unidirectional motion vectors, perform step 203; otherwise, perform step 204.

The initial motion vector set includes motion vectors acquired according to neighboring coding blocks of a current coding block and each coding block in a reference frame. Determining whether only unidirectional motion vectors exist refers to determining whether an initial candidate motion vector set includes only forward motion vectors, or only backward motion vectors.

Step 203: Add a reverse motion vector for each of the unidirectional motion vectors, and perform step 205.

If the initial motion vector set includes only forward motion vectors, a backward motion vector is added for each of the forward motion vectors; and if the initial motion vector set includes only backward motion vectors, a forward motion vector is added for each of the backward motion vectors. With reference to FIG. 3C, with a uniform linear motion model, each pair of forward and backward motion vectors should satisfy the following relationship: $V_f/T_f = -V_b/T_b$.

Step 204: Add a backward motion vector for each of the forward motion vectors as a reverse motion vector thereof, and add a forward motion vector for each of the backward motion vectors as a reverse motion vector thereof.

If the initial motion vector set includes both forward motion vectors and backward motion vectors, a backward motion vector is added for each of the forward motion vectors, and a forward motion vector is added for each of the backward motion vectors. With reference to FIG. 3C, with a uniform linear motion model, each pair of forward and backward motion vectors should satisfy the following relationship: $V_f/T_f = -V_b/T_b$.

Step 205: Generate a new candidate motion vector set according to the reverse motion vectors and the motion vectors in the initial candidate motion vector set.

Step 206: Assign an index identifier to each of the motion vectors in the new candidate motion vector set.

Step 207: Select, from the new candidate motion vector set in an RDO manner, a motion vector for coding.

Step 208: Write the index identifier of the selected motion vector and the selection information which is acquired according to the selected motion vector into a bitstream.

The index information written into the bitstream is equivalent to selection information of a motion vector at a coding end. When the bitstream is sent to a decoding end, the corresponding motion vector can be found according to the selection information.

It should be noted that, according to the above embodiment, in addition to selecting a motion vector in the RDO manner as described in steps 206 to 208, a motion vector may also be acquired in a manner of simultaneous derivation at both a coding end and a decoding end. The manner of acquiring a motion vector is not limited in the embodiments of the present invention.

Figure 5:
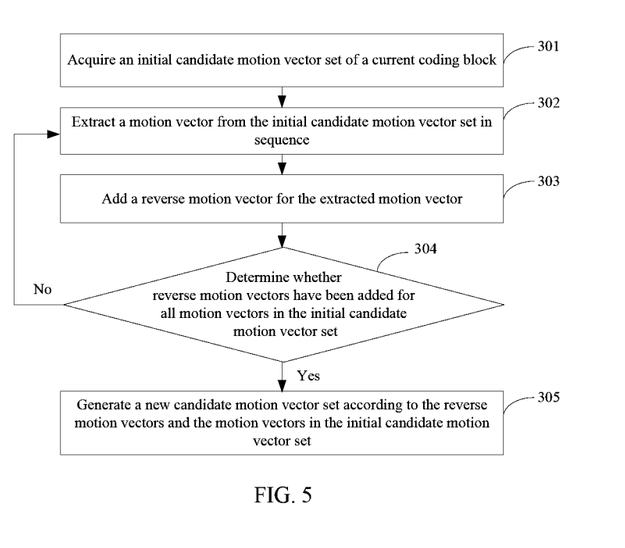
FIG. 5 is a flowchart of acquiring a third motion vector set according to another embodiment of the present invention.

Referring to FIG. 5, a flowchart of acquiring a second motion vector set according to another embodiment of the present invention is illustrated. This embodiment describes a process of determining motion vectors one by one and generating reverse motion vectors.

Step 301: Acquire an initial candidate motion vector set of a current coding block.

Specifically, a spatial candidate motion vector is acquired according to neighboring coding blocks of the current coding block, and a temporal candidate motion vector of the current coding block is acquired according to a reference frame. The reference frame may be a previous frame, or a next frame, or a previous frame and a next frame of the current frame where the current coding block is located. The spatial candidate motion vector and the temporal candidate motion vector constitute an initial motion vector set.

Step 302: Extract a motion vector from the initial candidate motion vector set in sequence.

Step 303: Add a reverse motion vector for the extracted motion vector.

If the extracted motion vector is a forward motion vector, a backward motion vector is added for the extracted motion vector as a reverse motion vector thereof and if the extracted motion vector is a backward motion vector, a forward motion vector is added for the extracted motion vector as a reverse motion vector thereof.

With reference to FIG. 3C, each pair of forward and backward motion vectors for which reverse motion vectors are added should satisfy the following relationship: $V_f/T_f = -V_b/T_b$.

Step 304: Determine whether reverse motion vectors have been added for all motion vectors in the initial candidate motion vector set; if reverse motion vectors have been added for all motion vectors in the initial candidate motion vector set, perform step 305; otherwise, return to step 302.

Step 305: Generate a new candidate motion vector set according to the reverse motion vectors and the motion vectors in the initial candidate motion vector set.

As can be seen from the above embodiments, according to the embodiments of the present invention, during construction of a candidate motion vector set for video coding, an initial candidate motion vector set of a current coding block is acquired; a reverse motion vector is added for each of the motion vectors in the initial candidate motion vector set; a new candidate motion vector set is generated according to the reverse motion vectors and the motion vectors in the initial candidate motion vector set; and a motion vector for coding is selected from the new candidate motion vector set to perform coding. The candidate motion vector set generated according to the embodiments of the present invention includes a reverse motion vector generated for a motion vector, where the reverse motion vector is equivalent to a predicted motion vector, so that the candidate motion vector set is more complete, and the motion vector selected from it for coding is more optimal, thereby improving coding performance.

In the embodiments of the present invention, the refined search for an optimal motion vector based on the information of the candidate motion vector set may be conducted in various manners.

The information of the candidate motion vector set may be of different information types, as exemplified below:

EXAMPLE 1

In some embodiments, the information of the candidate motion vector set is the number of candidate motion vectors; and conducting a refined search for an optimal motion vector based on information of the candidate motion vector set and performing motion prediction or compensation by using the motion vector acquired by the refined search includes:

if the number of motion vectors is smaller than or equal to N, conducting the refined search for an optimal motion vector, and performing the motion prediction or compensation by using the motion vector acquired by the refined search; and if the number of motion vectors is larger than N, conducting no refined search for a motion vector, and performing the motion prediction or compensation directly by using the optimal motion vector;

where N is a positive integer smaller than the total number of motion vectors in the candidate motion vector set.

The details are as follows:

calculating a template difference of each motion vector in the acquired candidate motion vector set, and selecting a motion vector with the minimum difference as an optimal motion vector;

calculating the number of motion vectors in the candidate motion vector set;

if the number of motion vectors is larger than 2, conducting no refined search, and performing the motion prediction or compensation directly by using the selected optimal motion vector; and if the number of motion vectors is smaller than 2, conducting a refined search for the selected optimal motion vector. The specific search method is as follows:

The refined search process is described by using FIG. 1 as an example. If the current optimal motion vector points to a position f of a reference frame, with f as a center and with ¼ accuracy as a step, four neighboring motion vector positions (b/e/j/g) or eight neighboring motion vector positions (a/b/c/e/g/i/j/k) may be acquired as a search range of the refined search for a motion vector; template differences of four or eight candidate motion vectors acquired by the refined search are calculated, and a candidate motion vector acquired by the refined search and having the minimum difference is selected as an optimal motion vector acquired by the refined search.

EXAMPLE 2

In some embodiments, the information of the candidate motion vector set may be the number of non-integer pixel motion vectors in the candidate motion vector set.

Conducting a refined search for an optimal motion vector based on information of the candidate motion vector set and performing motion prediction or compensation by using the motion vector acquired by the refined search includes:

if the number of non-integer pixel motion vectors is smaller than or equal to N, conducting the refined search for an optimal motion vector, and performing the motion prediction or compensation by using the motion vector acquired by the refined search; and if the number of non-integer pixel motion vectors is larger than N, conducting no refined search for a motion vector, and performing the motion prediction or compensation directly by using the optimal motion vector;

where N is a positive integer smaller than the total number of non-integer pixel motion vectors in the candidate motion vector set.

In a specific embodiment, N may be 2.

EXAMPLE 3

In some embodiments, information of a candidate motion vector set may be direction information of candidate motion vectors in the candidate motion vector set, for example, the number of principal directions in the candidate motion vector set or consistency of the directions.

Conducting a refined search for an optimal motion vector based on information of the candidate motion vector set and performing motion prediction or compensation by using the motion vector acquired by the refined search includes:

with the number of principal directions as an example, if the number of principal directions is smaller than N, conducting a refined search for an optimal motion vector, and performing motion prediction or compensation by using the motion vector acquired by the refined search; if the number of principal directions is larger than N, conducting no refined search for a motion vector, but performing motion prediction or compensation directly by using the optimal motion vector;

where N is a positive integer smaller than the total number of principal directions in the candidate motion vector set.

In a specific embodiment, calculation of the principal directions may be as follows:

The principal directions are four directions divided by four quadrants in a two-dimensional rectangular coordinate system.

The number of coordinate points represented by motion vectors (xi, yi) in the candidate motion vector set, falling within the four quadrants, is calculated. If a candidate motion vector falls within a quadrant, the principal direction represented by the quadrant exists; and if no motion vector falls within a quadrant, the principal direction does not exist.

The number of principal directions of the candidate motion vectors is calculated. If the number is smaller than or equal to 1, a refined search for a motion vector is conducted; and if the number is larger than 1, no refined search is conducted.

The principal direction may be divided into 8 directions and or 10 directions, or different coordinate systems are selected for representation. For example, a rectangular coordinate system is rotated to divide the principal direction of a motion vector.

The above method for determine whether to conduct a refined search for a motion vector based on the principal directions may also be implemented as follows:

The number of principal directions of the candidate motion vectors is calculated. If the number is larger than or equal to 1, a refined search for a motion vector is conducted; and if the number is smaller than 1, no refined search is conducted.

EXAMPLE 4

In some embodiments, the information of the candidate motion vector set may be determined according to information of the principal directions of non-integer pixel accuracy motion vectors in the candidate motion vector set.

A person skilled in the art may clearly understand that, the technique in the embodiments of the present invention may be implemented through software and a necessary general hardware platform. Based on such understanding, the technical solutions in the embodiments of the present invention essentially, or the part contributing to the prior art may be implemented in a form of a software product. The computer software product is stored in a storage medium, such as an ROM/RAM, a magnetic disk, or an optical disk, and includes several instructions for instructing a computer device (which may be a personal computer, a server, or a network device) to perform the methods described in the embodiments of the present invention or in some parts of the embodiments of the present invention.

The embodiments in this specification are all described in a progressive manner, mutual reference may be made to the same or similar part of the embodiments, and the focus in one embodiment is different from the focus in another embodiment. In particular, for a system embodiment, because it is basically similar to the method embodiments, its description is simple, and for the relevant part, reference may be made to the part of the description of the method embodiments.

The foregoing description is about the embodiments of the present invention, but is not intended to limit the protection scope of the present invention. Any modifications, equivalent substitutions and improvements made within the idea and principle of the present invention shall fall within the protection scope of the present invention.

What is claimed is:

1. A computer device comprising a storage medium storing instructions and computer hardware that executes the instructions to implement a motion prediction or compensation method, comprising:

acquiring a candidate motion vector set; and conducting a refined search for an optimal motion vector based on information of the candidate motion vector set, wherein the information of the candidate motion vector set is a number of candidate motion vectors, and, performing motion prediction or compensation by using the optimal motion vector acquired by the refined search, wherein the conducting the refined search for the optimal motion vector based on information of the candidate motion vector set and the performing the motion prediction or compensation by using the optimal motion vector acquired by the refined search comprises:

if the number of motion vectors is smaller than or equal to N, conducting the refined search for an optimal motion vector, and performing the motion prediction or compensation by using the motion vector acquired by the refined search; and if the number of motion vectors is larger than N, conducting no refined search for a motion vector, and performing the motion prediction or compensation directly by using the optimal motion vector;

wherein N is a positive integer smaller than the total number of motion vectors in the candidate motion vector set.

2. A computer device comprising a storage medium storing instructions and computer hardware that executes the instructions to implement a motion prediction or compensation method comprising:

acquiring a candidate motion vector set; and conducting a refined search for an optimal motion vector based on information of the candidate motion vector set, wherein the information of the candidate motion vector set is a number of non-integer pixel motion vectors in the candidate motion vector set, and, performing motion prediction or compensation by using the optimal motion vector acquired by the refined search;

wherein the conducting the refined search for the optimal motion vector based on the information of the candidate motion vector set and the performing the motion prediction or compensation by using the optimal motion vector acquired by the refined search comprises:

if the number of non-integer pixel motion vectors is smaller than or equal to N, conducting the refined search for an optimal motion vector, and performing the motion prediction or compensation by using the motion vector acquired by the refined search; and if the number of non-integer pixel motion vectors is larger than N, conducting no refined search for a motion vector, and performing the motion prediction or compensation directly by using the optimal motion vector;

wherein N is a positive integer smaller than the total number of non-integer pixel motion vectors in the candidate motion vector set.

3. The computer device according to claim 1, wherein:

the candidate motion vector set is a first motion vector set, wherein the first motion vector set is generated by using at least one of temporal and spatial motion vectors related to a current coding or decoding block.

4. The computer device according to claim 1, wherein:

the candidate motion vector set is a second motion vector set, and the acquiring a candidate motion vector set comprises:

generating an initial motion vector set by using at least one of temporal and spatial motion vectors related to a current coding or decoding block; and negating motion vectors in the initial motion vector set to acquire negated motion vectors;

wherein the negated motion vectors and the initial candidate motion vector set comprise the second motion vector set.

5. The computer device according to claim 4, wherein the negating motion vectors in the initial motion vector set comprises:

adding a reverse motion vector for each of the motion vectors in the initial candidate motion vector set according to a preset motion model;

wherein the preset motion model comprises a uniform linear motion model or an acceleration motion model.

6. The computer device according to claim 4, wherein the negating motion vectors in the initial motion vector set comprises:

determining whether the initial candidate motion vector set comprises only unidirectional motion vectors;

if the initial candidate motion vector set comprises only the unidirectional motion vectors, adding a reverse motion vector for each of the unidirectional motion vectors, wherein that only the unidirectional motion vectors exist comprises that only forward motion vectors exist or that only backward motion vectors exist; and if both the forward motion vectors and the backward motion vectors exist, adding a backward motion vector for each of the forward motion vectors as a reverse motion vector thereof, and adding a forward motion vector for each of the backward motion vectors as a reverse motion vector thereof.

7. The computer device according to claim 4, wherein the negating motion vectors in the initial motion vector set comprises:

extracting a motion vector from the initial candidate motion vector set in sequence;

adding a reverse motion vector for the extracted motion vector, wherein if the extracted motion vector is a forward motion vector, a backward motion vector is added for the extracted motion vector as a reverse motion vector thereof, and if the extracted motion vector is a backward motion vector, a forward motion vector is added for the extracted motion vector as a reverse motion vector thereof; and determining whether reverse motion vectors have been added for all motion vectors in the initial candidate motion vector set, and if reverse motion vectors have been added for all motion vectors in the initial candidate motion vector set, triggering execution of a step of generating a new candidate motion vector set; otherwise, returning to the step of extracting a motion vector from the initial candidate motion vector set in sequence.

8. The computer device according to claim 1, wherein:
the candidate motion vector set is a third motion vector set, and the acquiring a candidate motion vector set comprises:
generating an initial motion vector set by using at least one of temporal and spatial motion vectors related to a current coding or decoding block; and
negating motion vectors in the initial motion vector set to acquire negated motion vectors; and
rounding motion vectors in a new motion vector set formed by the negated motion vectors and the initial candidate motion vector set to acquire the third motion vector set.

9. The computer device according to claim 8, wherein the rounding a new motion vector comprises:
performing a rounding operation on a coordinate value of a non-integer pixel position motion vector, wherein the rounding operation comprises: for each dimension of coordinates of the non-integer pixel position motion vector, when a coordinate in the dimension is a non-integer pixel position, rounding the coordinate value of the non-integer pixel position motion vector in the dimension to one of integer pixel coordinate positions A and B if distances from the coordinate of the non-integer pixel position motion vector in the dimension to the integer pixel coordinate positions A and B adjacent to the non-integer pixel position in the dimension are the same, wherein an integer pixel coordinate position is determined by a sign of the coordinate value of the non-integer pixel position motion vector in the dimension.

10. The computer device according to claim 9, wherein that an integer pixel coordinate position is determined by a sign of the coordinate value of the non-integer pixel position motion vector in the dimension comprises:
when the sign of the coordinate value of the non-integer pixel position motion vector is positive, the integer pixel coordinate position acquired by rounding the coordinate value of the non-integer pixel position motion vector being a position with a smaller absolute value from A and B; when the sign of the coordinate value of the non-integer pixel position motion vector is negative, the integer pixel coordinate position acquired by rounding the coordinate value of the non-integer pixel position motion vector being a position with a larger absolute value from A and B; or
when the sign of the coordinate value of the non-integer pixel position motion vector is negative, the integer pixel coordinate position acquired by rounding the coordinate value of the non-integer pixel position motion vector being a position with a smaller absolute value from A and B; when the sign of the coordinate value of the non-integer pixel position motion vector is positive, the integer pixel coordinate position acquired by rounding the coordinate value of the non-integer pixel position motion vector being a position with a larger absolute value from A and B.

11. The computer device according to claim 9, wherein before the rounding the coordinate value of the non-integer pixel position motion vector, the method further comprises:
acquiring a candidate motion vector set of the current coding or decoding block,
adding a reverse motion vector for each of the motion vectors in the initial candidate motion vector set, and
generating a new candidate motion vector set according to the reverse motion vectors and the motion vectors in the initial candidate motion vector set to perform a rounding operation.

12. The computer device according to claim 9, wherein the rounding the coordinate value of the non-integer pixel position motion vector in the dimension to one of integer pixel coordinate positions A and B comprises:
shifting the coordinate value of the non-integer position motion vector in the dimension right by two bits in the dimension,
shifting the same left by two bits, and
rounding the coordinate value of the non-integer position motion vector to one of the integer pixel coordinate positions A and B.

13. The computer device according to claim 9, wherein the rounding the coordinate value of the non-integer pixel position motion vector further comprises:
if the coordinate position of the non-integer pixel position motion vector in the dimension is a ¼ pixel position, rounding the coordinate value of the non-integer pixel position motion vector in the dimension to a closest integer pixel coordinate position.

14. The computer device according to claim 13, wherein rounding a coordinate value of a ¼ pixel position motion vector further comprises:
calculating an absolute value of a coordinate in the dimension of the coordinate value of the ¼ pixel position motion vector, adding 2 to the calculated absolute value, shifting the same right by two bits and then left by two bits, and acquiring an absolute value of the rounded coordinate in the dimension, wherein a sign of the coordinate in the dimension remains unchanged.

15. The computer device according to claim 9, wherein after the rounding the coordinate value of the non-integer pixel position motion vector, the method further comprises:
selecting, from the candidate motion vector set after the rounding, a motion vector for coding or decoding, to perform coding and decoding.

16. The computer device according to claim 9, wherein the rounding the coordinate value of the non-integer pixel position motion vector further comprises:
setting an integer pixel position as a rounding target, and rounding a ½ pixel position and/or a ¼ pixel position to the integer pixel position; or setting an integer pixel position and a ½ pixel position as rounding targets, regarding the ½ pixel position as an integer pixel position, and rounding a ¼ pixel position and/or a ⅛ pixel position to the integer pixel position and the ½ pixel position.

17. The computer device according to claim 1, wherein:
the candidate motion vector set is a first motion vector set, wherein the first motion vector set is generated by using at least one of temporal and spatial motion vectors related to a current coding or decoding block.

18. The computer device according to claim 2, wherein:

the candidate motion vector set is a first motion vector set,
wherein the first motion vector set is generated by using at least one of temporal and spatial motion vectors related to a current coding or decoding block.

19. The computer device according to claim 1, wherein:
the candidate motion vector set is a second motion vector set, and the acquiring a candidate motion vector set comprises:
generating an initial motion vector set by using at least one of temporal and spatial motion vectors related to a current coding or decoding block; and
negating motion vectors in the initial motion vector set to acquire negated motion vectors;
wherein the negated motion vectors and the initial candidate motion vector set constitute the second motion vector set.

* * * * *